United States Patent [19]

Pace

[11] 4,043,043
[45] Aug. 23, 1977

[54] DEVICE FOR MEASURING THE AMOUNT OF PRODUCT IN BOTTLES, JARS AND CONTAINERS

[76] Inventor: Aylmer Raymond Pace, 2418 Otis Drive, Alameda, Calif. 94501

[21] Appl. No.: 628,610

[22] Filed: Nov. 3, 1975

[51] Int. Cl.² .......................... G01F 19/00; G01B 3/10
[52] U.S. Cl. ..................................... 33/137 L; 73/428
[58] Field of Search ................. 33/137 R, 137 L, 192, 33/150, 107 CB; 73/428

[56] References Cited

U.S. PATENT DOCUMENTS

| 2,388,303 | 11/1945 | Wise | 33/137 L |
| 3,672,061 | 6/1972 | Alessi | 33/169 R |
| 3,811,191 | 5/1974 | Kelly | 33/137 L |

FOREIGN PATENT DOCUMENTS

| 480,782 | 1952 | Canada | 33/150 |
| 22,973 | 1906 | Sweden | 33/150 |
| 5,263 | 1905 | United Kingdom | 73/428 |

*Primary Examiner*—Steven L. Stephan
*Attorney, Agent, or Firm*—William R. Piper

[57] ABSTRACT

This invention relates to a device for estimating, measuring and rendering calculable the unused portion of product remaining in a partly filled bottle, jar or container that is transparent or translucent, by utilizing an elastic stretchable scale. Said device is provided with a means to stretch said scale to predetermined lengths, each length referenced to a point on said device; each bottle jar or container to be estimated or measured referenced to said points. A means provided whereby a container of any size or shape can be measured by one or more of four distinct types of elastic stretchable scales.

3 Claims, 6 Drawing Figures

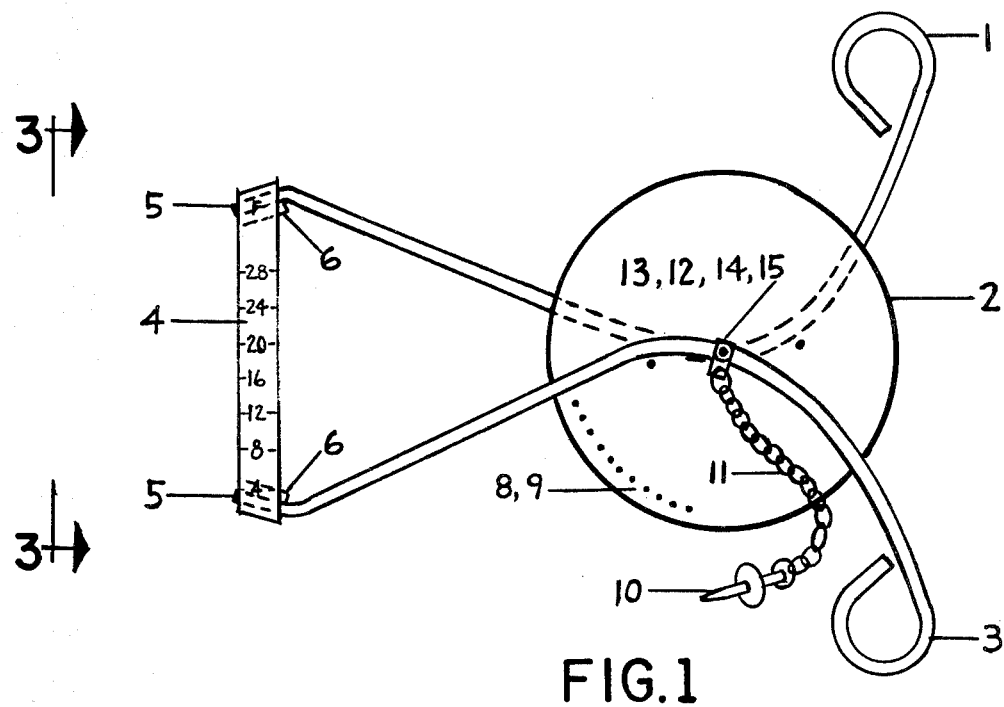
FIG. 1
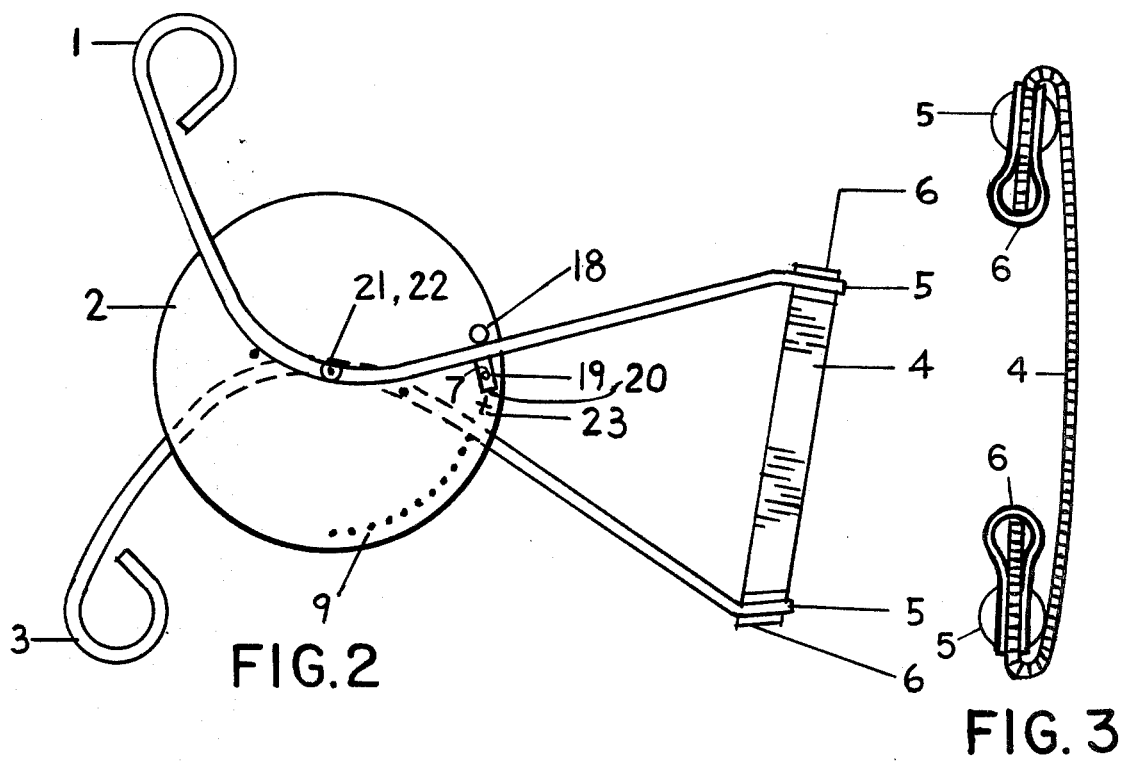
FIG. 2
FIG. 3

U.S. Patent  Aug 23, 1977  Sheet 2 of 2  4,043,043
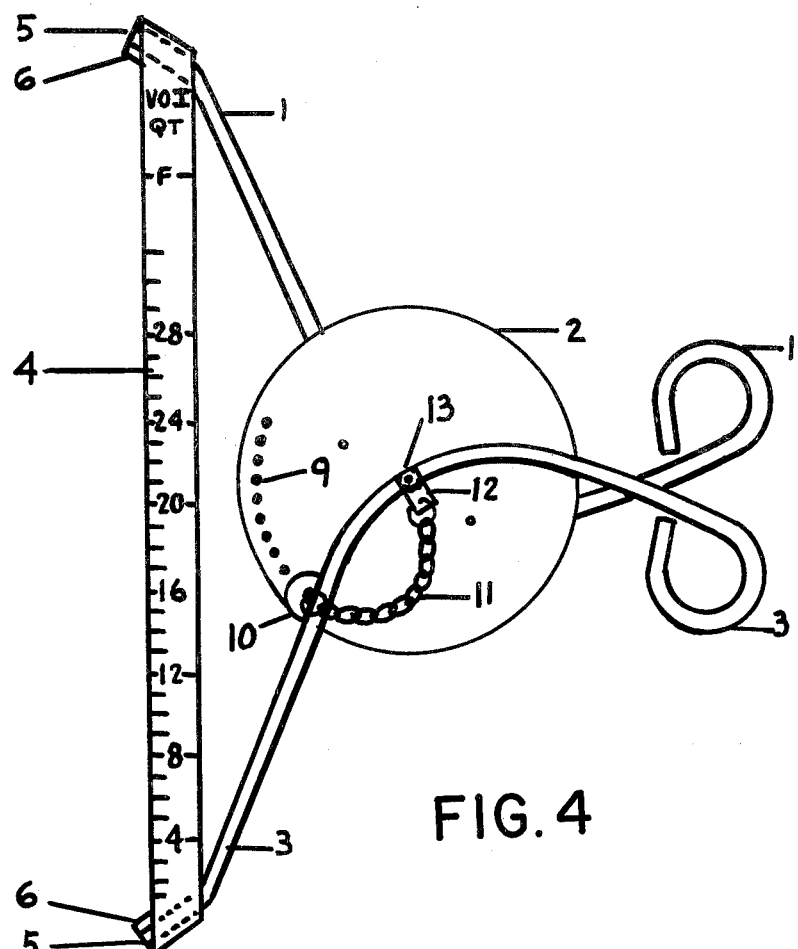
FIG. 4
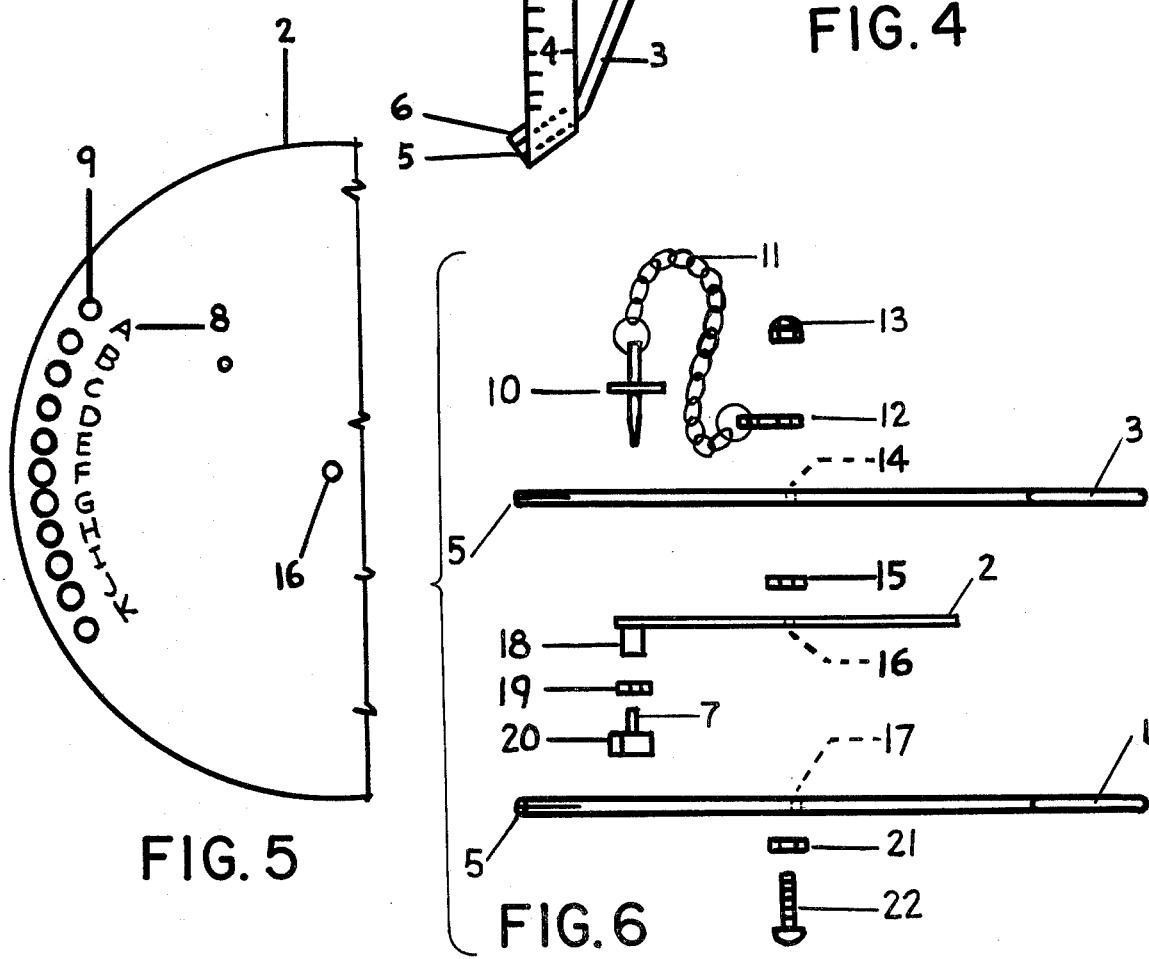
FIG. 5
FIG. 6

DEVICE FOR MEASURING THE AMOUNT OF PRODUCT IN BOTTLES, JARS AND CONTAINERS

SUMMARY OF THE INVENTION

This invention relates to the estimating and measuring of product remaining in a transparent or translucent bottle, jar or container, particularly the broad groups of products found in commerce. These products are necessarily packaged in a large plurality of sizes and shapes and wherein it is required to accurately estimate or measure the remaining quantity of product at frequent intervals. Heretofore, it has been largely a matter of guessing, weighing or counting the amount of product remaining in each of a myriad of differently shaped containers at frequent intervals of time. Often this guessing, weighing or counting is done by specialists; individuals who have a talent for or who are trained for long periods of time, thereby causing the process known as inventorying to be costly or delayed.

It is well known in the alcoholic beverage dispensing industry the consuming public is adversely effected by any obvious measuring device, scales attached to, even extraneous marks on the container. Therefore tavern or bar owners reluctantly use these aids to gain the vital information they reveal. It is common practice in the retail drug industry to rely on a specialist with many years experience, or regular personnel with little experience, to estimate weigh or count the remaining product in a partly filled container. It is apparent inventorying under these conditions is costly; continuity and accuracy is less than desired.

OBJECTS OF INVENTION

1. It is therefore a primary object of this invention to provide a device for expeditiously estimating, measuring and render calculable the unused portion in a partly filled bottle, jar or container that is transparent or translucent.

2. It is a further object of this invention to provide a device which can be utilized to estimate, measure and render calculable the portion of unused product remaining in a partly filled bottle, jar or container that is transparent or translucent, in a plurality of sizes or shapes of said container.

3. A still further object of this invention is to provide an elastic, stretchable scales for use in conjunction with the aforementioned device.

4. It is a still further object of this invention to provide four distinct types of elastic stretchable scales, as follows:

Type I

The graduations are calibrated in terms of percentage, the spacing of which is proportional to the space occupied by a like percentage of product in a typical bottle, jar or container.

Type II

The graduations are calibrated in equal divisions in terms of percentage.

Type III

The graduations are calibrated in terms of ounces, milliliters or grams. The graduations to be proportional to the space occupied by a like portion of product in a typical bottle, jar or container.

Type IV

The graduations are calibrated in terms of ounces, milliliters or grams. The graduations to be proportional to the space occupied by a like portion of product in a distinct bottle, jar or container.

5. Another object of this invention is to provide a device for estimating, measuring and render calculable the remaining portion of product in a bottle, jar or container, the scale of said device to be compatible to our present system of measure and metric measure. The aforementioned device equipped with aforementioned scale type I or II, is such as device.

6. A further object of this invention is to provide a device for accepting, holding and stretching said elastic, stretchable scale, said scale to be easily removeable, leaving the aforementioned device capable of accepting an elastic stretchable scale of a different type. Said device to be provided with means to open and stretch said elastic scale to a plurality of predetermined lengths, said lengths to be relative to a plurality of points on said device. Each point designated with a letter of the alphabet, each point so designated to correspond to a predetermined length of the elastic, stretchable scale, said device to be lockable at each of the so designated points.

7. Another object of this invention is to provide a means whereby each of the aforementioned points designated with a letter of the alphabet can be further adjusted. Each said adjustment to be designated with a plus sign.

8. A still further object of this invention is to provide a device and scales that are manufacturable in a plurality of sizes.

9. A further object of this invention is to provide a device to estimate, measure and render calculable solids, semi-solids as well as liquids.

10. Other objects and advantages in the details of construction will be apparent after reading the following descriptions with reference to the accompanying drawings wherein like reference characters have been used to identify the same parts throughout the drawings and wherein:

BRIEF DESCRIPTION OF THE DRAWINGS

FIG. 1 is a front view of the device, but not in use.

FIG. 2 is a rear view of FIG. 1.

FIG. 3 is an enlarged end view when looking in the direction of the arrows 3—3 of FIG. 1.

FIG. 4 is a front view of the device shown at maximum measuring position.

FIG. 5 is an enlarged view of substantially one-half of the disc shown in FIG. 4 with the arcuate row of openings in the disc being consecutively letter from A to K.

FIG. 6 is an exploded view of all of the parts used in the device.

DESCRIPTION OF PREFERRED EMBODIMENT

The present invention provides a simple, economically fabricated and easy to use device for estimating, measuring and rendering calculable the unused portion of product remaining in a partly filled bottle, jar or container which is transparent or translucent. In modern business practice the process known as inventorying is vital. Many aids have been developed to assist the businessman with this function, yet in the area of bottles, jars and containers we remain essentially archaic. The method usually used is guessing, weighing and counting. Therefore it would be of significant value if a device were available to estimate, measure and render calculable the unused portion of a partly filled bottle, jar or container that is transparent or translucent, regardless of size or shape. The present invention is such a device.

In carrying out my invention I provide a pair of levers 1 and 3 that are spaced laterally apart from each other by a disc 2, see FIGS. 1 to 4 inclusive. The levers have thumb and finger receiving looped portions at one of their ends and to be known as the handle ends. The opposite ends of both levers 1 and 3 are slotted at 5, see FIG. 6 and these slots removably receive the ends of U-shaped clips 6, see FIG. 3, which in turn frictionally grip the ends of an elastic stretchable scale 4. The portions of the ends of the levers 1 and 3 that are slotted at 5 are to be known as the leg ends of the levers.

The disc 2 is positioned between the two levers and it has a central opening 16, see FIG. 6, that is placed in registration with an intermediate opening 17 in the lever 1 and with an intermediate opening 14 in the lever 3. A bolt 22 has its shank inserted into a washer 21 and then the bolt shank is successively passed through the opening 17 in the lever 1, the opening 16 in the disc 2, the opening in a washer 15, an opening 14 in the lever 3, and an opening in a clip 12, all of these elements being shown in FIG. 6. A nut 13 is mounted on the end of the threaded bolt shank 22 and secures all of the parts together. The clip 12 has a chain 11 connected to it and the opposite end of the chain carries what I term a control pin 10. The purpose of the pin 10 will be described later.

The disc 2 is placed between the levers 1 and 3 and the three are secured together by the assembly bolt 22, not the exploded view of FIG. 6. The disc has an arcuate row of openings indicated generally at 9 in FIG. 5 and these openings are consecutively lettered at 8 from A to K, inclusive. The disc also has a projection 18, see FIGS. 3 and 6, that extends laterally from the rear face of the disc and is contacted by the lever 1. When the levers 1 and 3 have their handle-shaped ends moved toward each other from the position shown in FIG. 1 into that shown in FIG. 4, the scale 4 will be stretched and the lever 1 will contact the projection or stop 18 to cause the disc 2 to rotate about the bolt 22. The control pin 10 may be inserted into the opening K, in the disc 2 to prevent the return swing of the levers 1 and 2 back into their normal position shown in FIG. 1. The thickness of the disc 2 is sufficient to provide the strength needed to hold the scale 4 under tension when the scale is stretched to its maximum length. Scale 4 will be used without distortion.

The openings 9 in the disc 2 are utilized to hold the expanded scale 4 in the selected position by inserting the pin 10 in the desired opening, said position to be known as the primary position. The openings 9 are arranged in an arcuate row and are spaced equal distances apart, see FIG. 5. The total number of openings 9 on the disc will be determined by the number of different types of containers being measured for their liquid contents. Transparent or translucent bottles come in all shapes and sizes and each has its liquid rising to a certain level when the container is full. The F mark on the scale 4 in FIG. 4, represents the full mark for the container and the scale is calibrated in markings from the F mark to zero. The scale 4 in FIG. 4, is calibrated into four parts between each numbered graduation and from zero to F on the scale represents one hundred percent with each graduation on this particular scale equaling 3.125 percent.

In certain cases the fluid level in two different brands of product may be at slightly different heights relative to a common plane on which each rest, yet the quantity of product held by each container is the same. Where this is true, I provide novel means for accommodating the scale 4 to this difference in height. A rivet 7 has one end secured to the disc 2 and the rivet projects laterally from the rear face of the disc and in the same arc that the holes 9 are in. A washer 19 is mounted on the disc and a prism-shaped block 20 is rotatable on the rivet 7 and contacts the washer. The + sign 23 is embossed on the rear face of the disc 2 see FIG. 2, and is positioned so as to be visible and at the end of block 20 furthest removed from lever 1 when block 20 is rotated as to place the length of the block at right angles to the adjacent portion of the lever 1.

Block 20, FIG. 2, is utilized to further adjust the primary position that scale 4 is stretched to, in order to place the F mark on scale 4, FIG. 4, on a plane with the product in a particular container, when said container is filled to the capacity stated on the label. This same arrangement of the parts of the device are maintained when any later measuring of the product contents of the same container is made and after some of the product contents has been dispensed. The new and lower level of the product in the container is noted on the scale 4 and whatever calibration on the scale registers with the product level, this calibration will indicate the correct percentage of product still remaining in the container. (By multiplying the percentage remaining in the container by the quantity stated on the label you will have the correct amount now in the container, stated in the terms appearing on the label).

Many times the adjustment provided by holes 9, FIG. 5, will be sufficient to place the F mark scale 4, FIG. 4, on a plane with the product in a full container. In a case like that, the secondary adjustment provided by block 20 will not be used. Block 20, FIG. 2, should be turned so as to place the length side parallel to the adjacent portion of the lever 1. In this position the secondary adjustment provided by block 20 is not employed.

Pin 10 is utilized to lock scale 4 in the stretched position it will be used in. This position is determined by placing the device in a measuring relationship to a full container that will subsequently be measured. Levers 1 and 2 to be operated in a manner to stretch scale 4, FIG. 4, to the length that will place the F mark on scale 4 on a plane with the product in the full container. Use the designated hole in disc 2, FIG. 5, that would maintain this position if pin 10, FIG. 1, were inserted, employ secondary adjustment block 20, FIG. 2, if necessary. (In order to line the F mark scale 4 up with the product level). The designated hole 9, FIG. 5, used and whether the secondary adjustment block 20, FIG. 2, is employed or not, should be noted. The device must be set to these conditions each subsequent time this brand and size container is measured.

What is claimed:

1. A combination comprising:
   a. a pair of elongated members having one end of each member bent to form a handle portion, the opposite end of each member forming a leg, said members being pivotally attached to one another at a point intermediate the ends of each member, and each member being bent such that as the handle portions's are closed toward each other the leg portions are moved apart;

b. an elastic stretchable elongated member connected at its ends to the ends of said legs, said elastic member having a scale thereon so that as the legs are moved apart the scale on said elastic member is stretched;
c. locking means having predetermined locking positions to lock the elongated members in predetermined locked positions, each of said predetermined locked positions providing a predetermined separation distance for the ends of said legs; and
d. second adjustment means which provide an additional predetermined adjustment of the separation distance so that upon locking of said legs in one of said locked positions by said locking means, said second adjustment means can add the distance of said predetermined adjustment to the separation distance of the ends of said legs, said locking means having reference characters adjacent each of said locking positions.

2. A combination comprising:
a. a pair of elongated members having one end of each member bent to form a handle portion, the opposite end of each member forming a leg;
b. a disc positioned between the two members, said members being pivotally attached to one another at a point intermediate the ends of each member, the pivotal connection including a bolt that extends through the center of said disc, each member being bent such that as the handle portions are closed toward each other the leg portions are moved apart and said disc is connected with one of said elongated members so as to rotate as a unit therewith as the member is moved;
c. an elastic stretchable elongated member connected at its ends to the ends of said legs, said elastic member having a scale thereon so that as the legs are moved apart the scale on said elastic member is stretched, the elastic member yieldingly urging the legs toward each other;
d. locking means having predetermined locking positions in the form of an arcuate row of openings, the center of the arcuate row coinciding with the axis of said pivot bolt, said locking means also including a control pin insertable into a desired opening in said arcuate row of openings for acting as a stop for the other elongated member as said elastic member tends to swing the legs of said elongated members toward each other;
e. whereby said elongated members are held in a predetermined locked position, each of said predetermined locked positions providing a desired predetermined separation distance for the ends of said legs, said locking means having reference characters adjacent each of said locking positions.

3. The combination as set forth in claim 2: and in which
a. a second adjustment means is used which provides additional predetermined adjustment of the separation distance between the legs of said pair of members so that upon locking of said legs in one of said locked positions by said locking means, said second adjustment means can add the distance of said predetermined adjustment to the separation distance of the ends of said legs.

* * * * *